US012750200B2

(12) United States Patent
Abdelghaffar et al.

(10) Patent No.: US 12,750,200 B2
(45) Date of Patent: Sep. 29, 2026

(54) DEMODULATION REFERENCE SIGNAL PRECODING IN PRECODING RESOURCE BLOCK GROUPS ASSOCIATED WITH SUBBAND FULL DUPLEX CONFIGURATIONS

(71) Applicant: QUALCOMM Incorporated, San Diego, CA (US)

(72) Inventors: Muhammad Sayed Khairy Abdelghaffar, San Jose, CA (US); Abdelrahman Mohamed Ahmed Mohamed Ibrahim, San Diego, CA (US); Qian Zhang, Basking Ridge, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/470,917

(22) Filed: Sep. 20, 2023

(65) Prior Publication Data

US 2024/0163070 A1 May 16, 2024

Related U.S. Application Data

(60) Provisional application No. 63/383,680, filed on Nov. 14, 2022.

(51) Int. Cl.
*H04L 5/14* (2006.01)
*H04L 5/00* (2006.01)

(52) U.S. Cl.
CPC ............ *H04L 5/143* (2013.01); *H04L 5/0051* (2013.01); *H04L 5/0053* (2013.01)

(58) Field of Classification Search
CPC ...... H04L 5/143; H04L 5/0051; H04L 5/0053
See application file for complete search history.

(56) References Cited

U.S. PATENT DOCUMENTS

2018/0097663 A1* 4/2018 Jiang .................... H04B 7/0626
2019/0132157 A1* 5/2019 Hosseini ............... H04L 5/0048

(Continued)

OTHER PUBLICATIONS

CATT: "Discussion on Subband Non-overlapping Full Duplex", 3GPP TSG RAN WG1 #111, R1-2211196, Type Discussion, FS_NR_DUPLEX_EVO, 3rd Generation Partnership Project, Mobile Competence Centre, 650, Route Des Lucioles, F-06921, Sophia-Antipolis Cedex, France, vol. 3GPP RAN 1, No. Toulouse, FR, Nov. 14, 2022-Nov. 18, 2022, Nov. 7, 2022, 15 Pages, XP052221761, Sections 2.1.1-2.1.5.

(Continued)

*Primary Examiner* — Ronald B Abelson
(74) *Attorney, Agent, or Firm* — Harrity & Harrity, LLP

(57) ABSTRACT

Various aspects of the present disclosure generally relate to wireless communication. In some aspects, a user equipment (UE) may receive a resource allocation that includes a set of physical resource blocks (PRBs) for a communication to be communicated in at least one precoding resource block group (PRG), the at least one PRG comprising a partial PRG associated with an edge of a subband of a subband full duplex (SBFD) configuration, wherein the communication includes a demodulation reference signal (DMRS) and a physical downlink data channel signal or a physical uplink data channel signal. The UE may communicate the communication based on a partial PRG rule associated with the partial PRG. Numerous other aspects are described.

30 Claims, 10 Drawing Sheets

(56) References Cited

U.S. PATENT DOCUMENTS

| | | | | |
|---|---|---|---|---|
| 2019/0261325 | A1* | 8/2019 | Manolakos | H04L 5/0053 |
| 2020/0053703 | A1* | 2/2020 | Akkarakaran | G01S 1/20 |
| 2020/0275416 | A1 | 8/2020 | Haghighat et al. | |
| 2022/0278880 | A1* | 9/2022 | Matsumura | H04J 13/004 |

OTHER PUBLICATIONS

International Search Report and Written Opinion—PCT/US2023/075962—ISA/EPO—Feb. 5, 2024.

Qualcomm Incorporated: "Feasibility and Techniques for Subband Non-overlapping Full Duplex", 3GPP TSG RAN WG1, Meeting #111, R1-2212115, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 5, 2022, pp. 1-42, XP052222678, Sections 3.1, 3.1.1, 3.1.2, 3.1.3.

Spreadtrum Communications: "Discussion On Subband Non-overlapping Full Duplex", 3GPP TSG RAN WG1 #111, R1-2211233, Type Discussion, FS_NR DUPLEX_EVO, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 7, 2022, XP052221798, pp. 1-17, Sections 2.2.1, 2.2.2, 2.2.3.

* cited by examiner

DEMODULATION REFERENCE SIGNAL PRECODING IN PRECODING RESOURCE BLOCK GROUPS ASSOCIATED WITH SUBBAND FULL DUPLEX CONFIGURATIONS

CROSS-REFERENCE TO RELATED APPLICATION

This Patent Applications claims priority to U.S. Provisional Patent Application No. 63/383,680, filed on Nov. 14, 2022, entitled "DEMODULATION REFERENCE SIGNAL PRECODING IN PRECODING RESOURCE BLOCK GROUPS ASSOCIATED WITH SUBBAND FULL DUPLEX CONFIGURATIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for demodulation reference signal precoding in precoding resource block groups associated with subband full duplex configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive a resource allocation that includes a set of physical resource blocks (PRBs) for a communication to be communicated in at least one precoding resource block group (PRG), the at least one PRG comprising a partial PRG associated with an edge of a subband of a subband full duplex (SBFD) configuration, wherein the communication includes a demodulation reference signal (DMRS) and a physical downlink data channel signal or a physical uplink data channel signal. The one or more processors may be configured to communicate the communication based on a partial PRG rule associated with the partial PRG.

Some aspects described herein relate to a network node for wireless communication. The network node may include a memory and one or more processors coupled to the memory. The one or more processors may be configured to transmit a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal. The one or more processors may be configured to communicate the communication based on a partial PRG rule associated with the partial PRG.

Some aspects described herein relate to a UE for wireless communication. The user equipment may include a memory and one or more processors coupled to the memory. The one or more processors may be configured to receive a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal. The one or more processors may be configured to perform a wireless communication operation based on a precoding rule associated with the at least one PRG.

Some aspects described herein relate to a network node for wireless communication. The network node may include a memory and one or more processors coupled to the memory. The one or more processors may be configured to transmit a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal. The one or more processors may be configured to perform a wireless communication operation based on a precoding rule associated with the at least one PRG.

Some aspects described herein relate to a method of wireless communication performed by a UE. The method may include receiving a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal. The method may include communicating the communication based on a partial PRG rule associated with the partial PRG.

Some aspects described herein relate to a method of wireless communication performed by a network node. The method may include transmitting a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal. The method may include communicating the communication based on a partial PRG rule associated with the partial PRG.

Some aspects described herein relate to a method of wireless communication performed by a UE. The method may include receiving a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal. The method may include performing a wireless communication operation based on a precoding rule associated with the at least one PRG.

Some aspects described herein relate to a method of wireless communication performed by a network node. The method may include transmitting a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal. The method may include performing a wireless communication operation based on a precoding rule associated with the at least one PRG.

Some aspects described herein relate to a non-transitory computer-readable medium that stores a set of instructions for wireless communication by a UE. The set of instructions, when executed by one or more processors of the UE, may cause the UE to receive a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal. The set of instructions, when executed by one or more processors of the UE, may cause the UE to communicate the communication based on a partial PRG rule associated with the partial PRG.

Some aspects described herein relate to a non-transitory computer-readable medium that stores a set of instructions for wireless communication by a network node. The set of instructions, when executed by one or more processors of the network node, may cause the network node to transmit a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal. The set of instructions, when executed by one or more processors of the network node, may cause the network node to communicate the communication based on a partial PRG rule associated with the partial PRG.

Some aspects described herein relate to a non-transitory computer-readable medium that stores a set of instructions for wireless communication by a UE. The set of instructions, when executed by one or more processors of the UE, may cause the UE to receive a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal. The set of instructions, when executed by one or more processors of the UE, may cause the UE to perform a wireless communication operation based on a precoding rule associated with the at least one PRG.

Some aspects described herein relate to a non-transitory computer-readable medium that stores a set of instructions for wireless communication by a network node. The set of instructions, when executed by one or more processors of the network node, may cause the network node to transmit a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal. The set of instructions, when executed by one or more processors of the network node, may cause the network node to perform a wireless communication operation based on a precoding rule associated with the at least one PRG.

Some aspects described herein relate to an apparatus for wireless communication. The apparatus may include means for receiving a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal. The apparatus may include means for communicating the communication based on a partial PRG rule associated with the partial PRG.

Some aspects described herein relate to an apparatus for wireless communication. The apparatus may include means for transmitting a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal. The apparatus may include means for communicating the communication based on a partial PRG rule associated with the partial PRG.

Some aspects described herein relate to an apparatus for wireless communication. The apparatus may include means for receiving a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal. The apparatus may include means for performing a wireless communication operation based on a precoding rule associated with the at least one PRG.

Some aspects described herein relate to an apparatus for wireless communication. The apparatus may include means for transmitting a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal. The apparatus may include means for performing a wireless communication operation based on a precoding rule associated with the at least one PRG.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
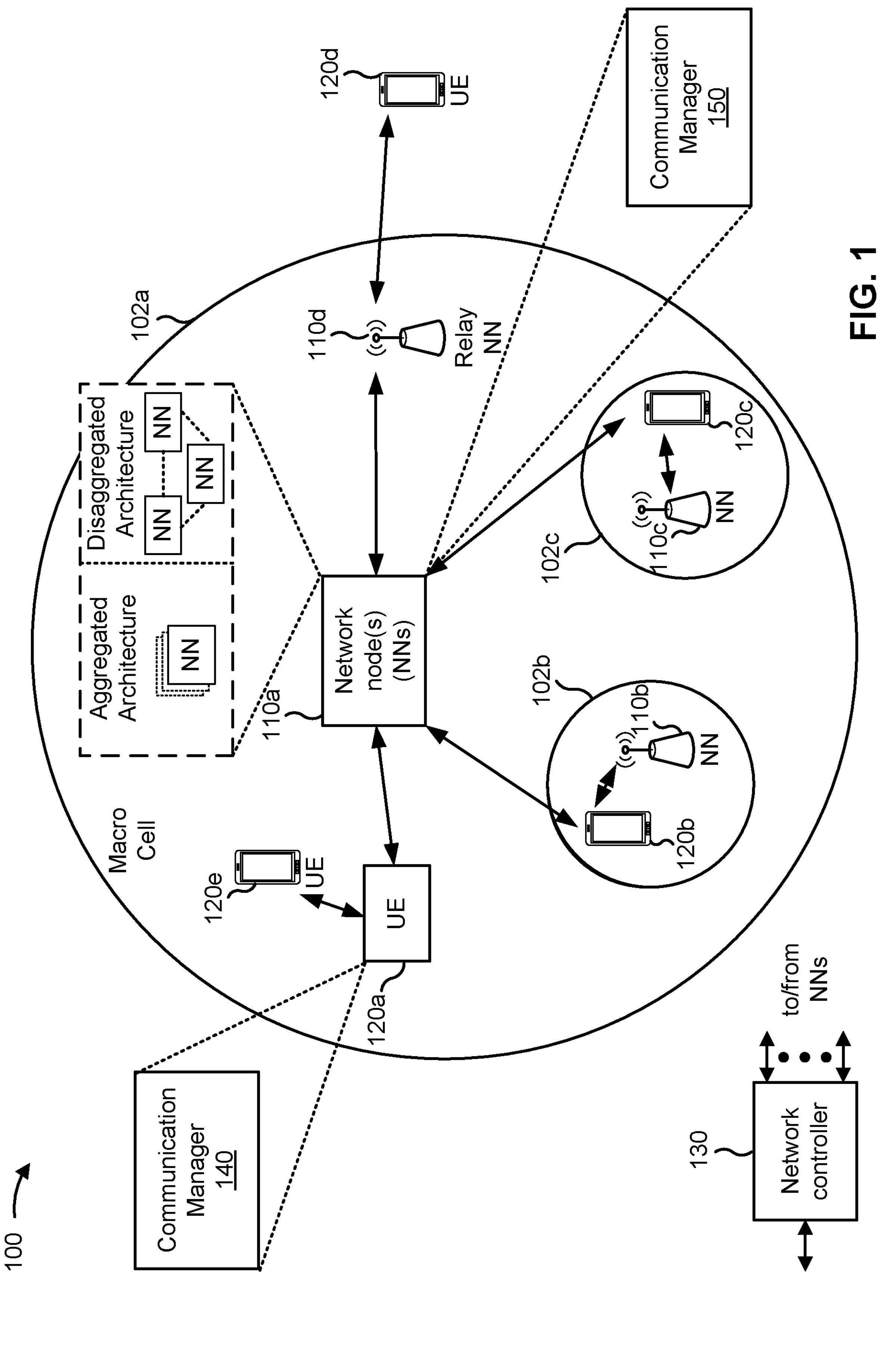
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a resource allocation that includes a set of physical resource blocks (PRBs) for a communication to be communicated in at least one precoding resource block group (PRG), the at least one PRG comprising a partial PRG associated with an edge of a subband of a subband full duplex (SBFD) configuration, wherein the communication includes a demodulation reference signal (DMRS) and a physical downlink data channel signal or a physical uplink data channel signal; and communicate the communication based on a partial PRG rule associated with the partial PRG. Additionally, or alternatively, the communication manager 140 may perform one or more other operations described herein.

In some aspects, the network node 110 may include a communication manager 150. As described in more detail elsewhere herein, the communication manager 150 may transmit a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal; and communicate the communication based on a partial PRG rule associated with the partial PRG. Additionally, or alternatively, the communication manager 150 may perform one or more other operations described herein.

In some aspects, the UE 120 may include a communication manager 140. As described in more detail elsewhere herein, the communication manager 140 may receive a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal; and perform a wireless communication operation based on a precoding rule associated with the at least one PRG. Additionally, or alternatively, the communication manager 140 may perform one or more other operations described herein.

In some aspects, the network node 110 may include a communication manager 150. As described in more detail elsewhere herein, the communication manager 150 may transmit a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal; and perform a wireless communication operation based on a precoding rule associated with the at least one PRG. Additionally, or alternatively, the communication manager 150 may perform one or more other operations described herein.

As indicated above, FIG. 1 is provided as an example. Other examples may differ from what is described with regard to FIG. 1.

Figure 2:
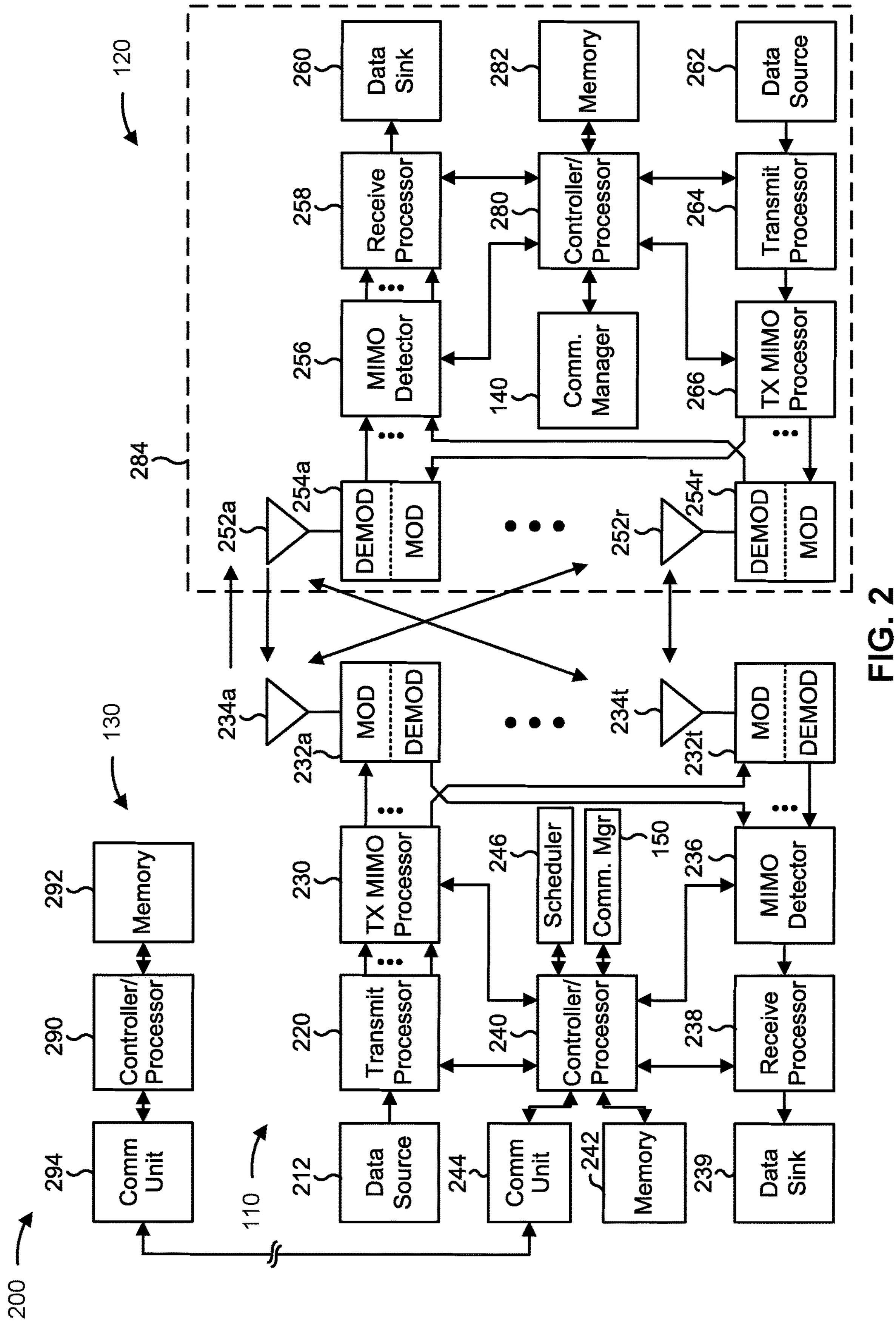
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a network node, such as for millimeter wave communications and/or the like. In such a case, the network node may provide the UE with a configuration of transmission configuration indicator (TCI) states that respectively indicate beams that may be used by the UE, such as for receiving a physical downlink shared channel (PDSCH). A TCI state indicates a spatial parameter for a communication.

For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. The network node may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a QCL type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, and/or any other component(s) of FIG. 2 may perform one or more techniques associated with DMRS precoding in PRGs associated with SBFD configurations, as described in more detail elsewhere herein. For example, the controller/processor 240 of the network node 110, the controller/processor 280 of the UE 120, and/or any other component(s) of FIG. 2 may perform or direct operations of, for example, process 500 of FIG. 5, process 600 of FIG. 6, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 500 of FIG. 5, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal; and/or means for communicating the communication based on a partial PRG rule associated with the partial PRG. In some aspects, the UE 120 includes means for receiving a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal; and/or means for performing a wireless communication operation based on a precoding rule associated with the at least one PRG. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal; and/or means for communicating the communication based on a partial PRG rule associated with the partial PRG. In some aspects, the network node 110 includes means for transmitting a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal; and/or means for performing a wireless communication operation based on a precoding rule associated with the at least one PRG. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
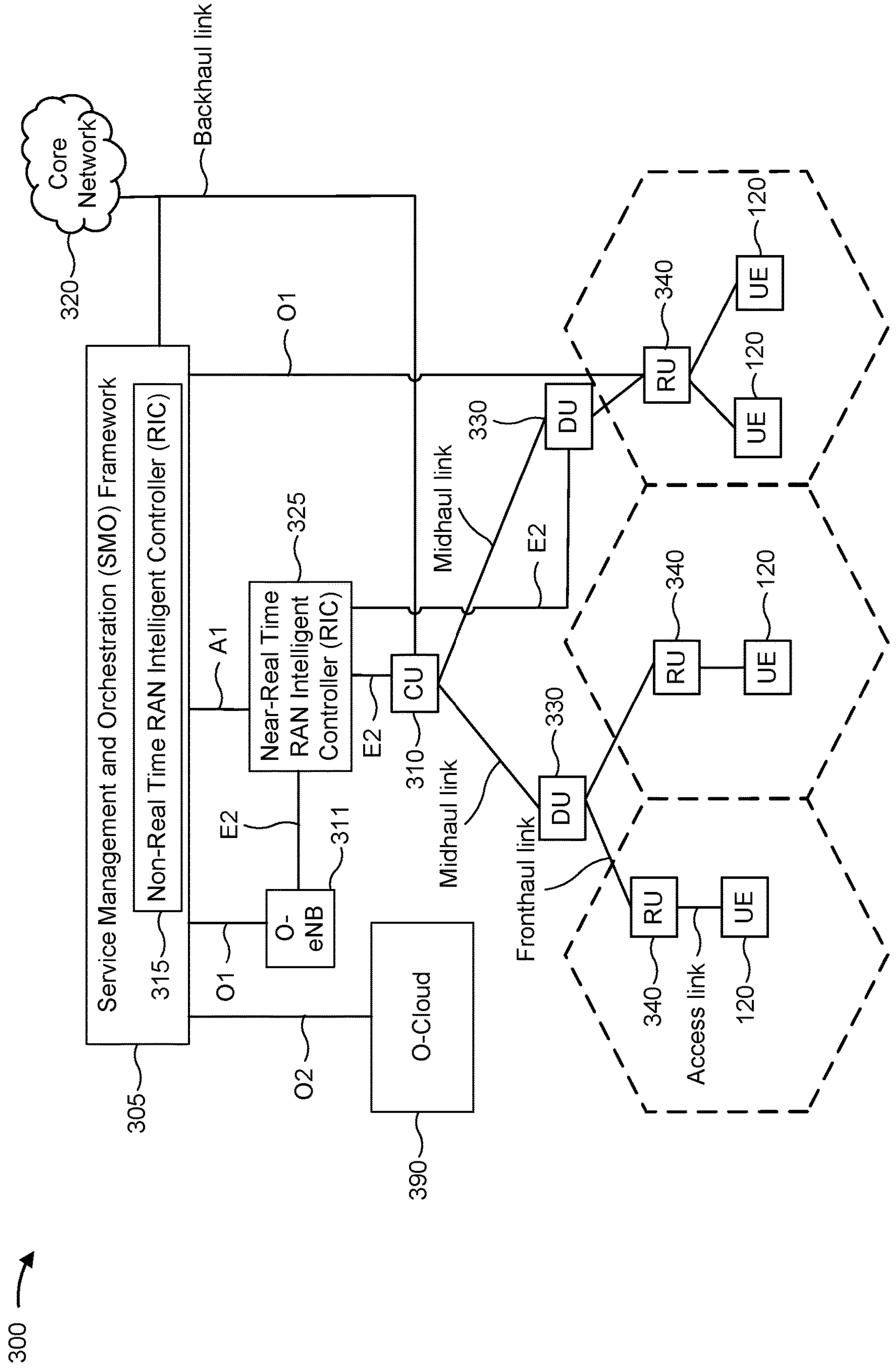
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective RF access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as AI interface policies).

As indicated above, FIG. 3 is provided as an example. Other examples may differ from what is described with regard to FIG. 3.

A full-duplex (FD) communication is a communication that utilizes overlapped time resources at a single node (such as a UE or a base station) for transmission and reception. For example, a UE or a network node may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different TCI states defining different beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a QCL type. A QCL type may indicate one or more spatial parameters to be derived from the source signal. The source signal may be referred to as a QCL source. FD communications can include dynamic traffic (such as scheduled by DCI) and/or semi-static traffic. Semi-static traffic is traffic associated with a semi-persistent resource, such as a semi-persistent scheduling (SPS) configured resource or a configured grant (CG).

Resources (e.g., slots and/or symbols) can be configured to have an SBFD format. A resource having an SBFD format includes one or more SBFD symbols. An SBFD symbol is a symbol with one or more subbands (referred to herein as SBFD subbands) that a network node (such as a gNB) can use or will use for SBFD operation. For SBFD operation within a time division duplexing (TDD) carrier, an SBFD subband may include one resource block, or a set of consecutive resource blocks, for a same transmission direction. In some aspects, for SBFD operation within a TDD carrier, an SBFD subband consists of one resource block, or a set of consecutive resource blocks, for a same transmission direction. In some aspects, "SBFD symbols" are defined as symbols with subbands that a network node would use for SBFD operation. In some aspects, for SBFD operation within a TDD carrier, an SBFD subband consists of one resource block (RB) or a set of consecutive RBs for the same transmission direction.

An SBFD resource (that is, a resource having an SBFD format) may include one or more symbols and/or one or more slots. As mentioned above, an SBFD resource may include at least one uplink subband (that is, a subband used for uplink communication by a UE) and at least one downlink subband (that is, a subband used for downlink communication by a UE). In a resource with an SBFD format, a network node may perform simultaneous transmission of downlink transmissions and reception of uplink transmissions on a subband basis. For example, the network node may simultaneously communicate with a first UE on the downlink and a second UE on the uplink. In some examples, the first and/or second UE may be configured with only the subband(s) in use by the respective UE for communication. This may be because, for example, the first and/or second UE may not have a capability for SBFD communication. In some examples, the first and/or second UE may be SBFD-aware based on being configured to utilize an SBFD formatted resource. For example, if a UE has a capability for SBFD communication, the UE may be aware that a given resource has an SBFD format (while utilizing the resource in only one transmission direction), or may perform FD communication in the given resource.

Various aspects relate generally to uplink and/or downlink PRGs. Some aspects more specifically relate to PRG for non-codebook (NCB) based frequency-selective uplink precoding. In general, NCB-based precoding provides a UE with flexibility to select a precoder that is well suited to the transmission channel. The use of NCB-based precoding reduces downlink signaling because a network node need not signal a precoding matrix indicator (PMI) or precoder to the UE. NCB-based frequency-selective precoding allows the UE and/or the network node to use different NCB-based precoders in different PRGs, meaning that the UE and/or the network node has the flexibility to select a precoder that is well suited for a transmission in a given PRG. To support frequency-selective precoding, a UE may use the same precoder for resource blocks within a given PRG (that is, within a given frequency range corresponding to the PRG).

In some cases, a UE may assume that a precoding granularity is $P'_{BWP,i}$ consecutive resource blocks in the frequency domain $P'_{BWP,i}$ can be equal to one of the values among {2, 4, wideband}. If $P'_{BWP,i}$ is determined as "wideband", the UE can be not expected to be scheduled with non-contiguous PRBs, and the UE can assume that the same precoding is applied to the allocated resource associated with a same TCI state or a same QCL assumption. If $P'_{BWP,i}$ is determined as one of the values among {2, 4}, PRGs partitions the bandwidth part i with $P'_{BWP,i}$ consecutive PRBs. An actual number of consecutive PRBs in each PRG could be one or more. In some cases, the UE can assume the same precoding is applied for any downlink contiguous allocation of PRBs in a PRG.

When receiving a PDSCH scheduled by a physical downlink control channel (PDCCH) with DCI format 1_1 with cyclic redundancy check (CRC) scrambled by a cell-radio network temporary identifier (RNTI), an MCS-C-RNTI, or a configured scheduling (CS)-RNTI, and if the higher layer parameter prb-BundlingType is set to 'dynamicBundling', the higher layer parameters bundleSizeSet1 and bundleSizeSet2 can configure two sets of $P'_{BWP,i}$ values. The first set can take one or two $P'_{BWP,i}$ values among {2, 4, wideband}, and the second set can take one $P'_{BWP,i}$ value among {2, 4, wideband}. If the PRB 'bundling size indicator' signaled in DCI format 1_1 is set to '0', the UE can use the $P'_{BWP,i}$ value from the second set of $P'_{BWP,i}$ values when receiving PDSCH scheduled by the same DCI. If the PRB 'bundling size indicator' is set to '1' and one value is configured for the first set of $P'_{BWP,i}$ values, the UE can use this $P'_{BWP,i}$ value when receiving PDSCH scheduled by the same DCI. If the PRB 'bundling size indicator' is set to '1' and two values are configured for the first set of $P'_{BWP,i}$ values as 'n2-wideband' (corresponding to two $P'_{BWP,i}$ values 2 and wideband) or 'n4-wideband' (corresponding to two $P'_{BWP,i}$ values 4 and wideband), the UE can use the value when receiving PDSCH scheduled by the same DCI. For example, if the scheduled PRBs are contiguous and the size of the scheduled PRBs is larger than size $N^{size}_{BWP}/2$, $P'_{BWP,i}$ is the same as the scheduled bandwidth, otherwise $P'_{BWP,i}$ is set to the remaining configured value of 2 or 4, respectively.

When receiving PDSCH scheduled by PDCCH with DCI format 1_1 with CRC scrambled by C-RNTI, MCS-C-RNTI, or CS-RNTI, if the higher layer parameter prb-BundlingType is set to 'staticBundling', the $$P'_{BWP,i}$$

value can configured with the single value indicated by the higher layer parameter bundleSize. When a UE is configured with nominal PRG size=2 for bandwidth part i, or when a UE is configured with interleaving unit of 2 for virtual resource block (VRB) to PRB mapping provided by the higher layer parameter vrbToPRB-Interleaver given by PDSCH-Config for bandwidth part i, the UE may not be expected to be configured with $$P'_{BWP,i} = 4.$$

When precoderGranularity=allContiguousRBs, a UE may not expect to be configured a set of resource blocks of a control resource set (CORESET) that includes more than four sub-sets of resource blocks that are not contiguous in frequency or any resource element of a CORESET to overlap with any resource element determined from lte-CRS-ToMatchAround, or from LTE-CRSPatternList, or with any RE of a SS/PBCH block.

In some cases, when a PRG is partial at a downlink or uplink subband edge, the UE (and/or network node) may not know whether to ignore downlink or uplink transmissions with partial PRG. As a result, communications may be missed or inefficient due to a lack of rules for handling partial PRGs at subband edges. In some cases, a UE may be scheduled within PDSCH allocation across two downlink subbands and a network node may use wideband precoding. In this case, the UE and/or network node may not allow for non-contiguous PDSCH when wideband precoding is used. As a result, communications may be missed or inefficient due to a lack of rules for handling precoding across non-contiguous PRBs. In some cases, for the PDCCH DMRS, when precoderGranularity is set to 'allContigousRBs' and CORESET partially overlaps with an uplink subband and/or guardband, the UE may be unaware of how to apply precoding associated with the non-contiguous DMRS. As a result, communications may be missed or inefficient due to a lack of rules for handling precoding within non-contiguous PRBs within a CORESET that overlaps an uplink subband and/or a guardband.

Some aspects of the techniques and apparatuses described herein may provide for DMRS precoding in PRGs associated with subband full duplex configurations. For example, in some aspects, a UE may receive a resource allocation that includes a set of PRBs for a communication to be communicated in at least one PRG, the at least one PRG comprising a partial PRG associated with an edge of a subband of an SBFD configuration. The communication may include a DMRS. The UE may communicate the communication based on a partial PRG rule associated with the partial PRG. In some aspects, the UE may receive a resource allocation, associated with an SBFD configuration, that includes a non-contiguous set of PRBs, associated with two downlink subbands within a downlink bandwidth part, for a communication to be communicated in at least one PRG. The UE may perform a wireless communication operation based on a precoding rule associated with the at least one PRG. In this way, some aspects may facilitate precoding in partial PRGs at subband edges and in non-contiguous PRBs across subbands, thereby facilitating more efficient communications associated with SBFD configurations.

Figure 4:
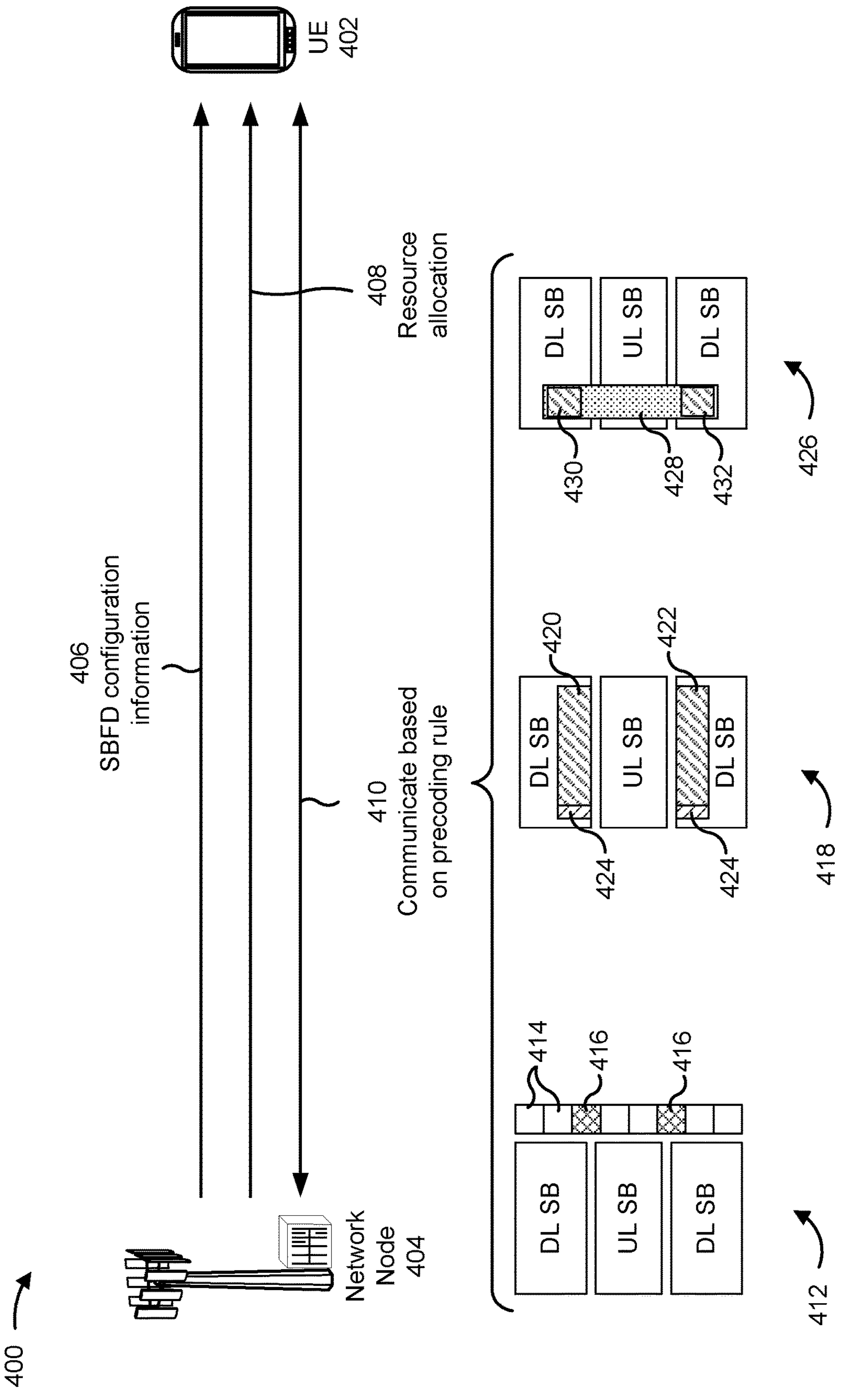
FIG. 4 is a diagram illustrating an example of demodulation reference signal (DMRS) and physical downlink channel or physical uplink channel precoding in precoding resource block groups (PRGs) associated with subband full duplex (SBFD) configurations, in accordance with the present disclosure.

FIG. 4 is a diagram illustrating an example 400 of DMRS and physical downlink channel or physical uplink channel precoding in PRGs associated with SBFD configurations, in accordance with the present disclosure. As shown in FIG. 4, a UE 402 and a network node 404 may communicate with one another. In some aspects, the UE 402 may be, be similar to, include, or be included in, the UE 120 depicted in FIGS. 1-3. In some aspects, the network node 404 may be, be similar to, include, or be included in, the network node 110 depicted in FIGS. 1 and 2, and/or one or more components of the disaggregated base station architecture 300 depicted in FIG. 3.

As shown by reference number 406, the network node 404 may transmit, and the UE 402 may receive, SBFD configuration information. The SBFD configuration information may, for example, be indicative of an SBFD configuration for communicating, based on a half duplex configuration at the UE 402, with the SBFD network node 404. In this way, the UE 402 may be an SBFD-aware UE due to being aware of network operation in SBFD mode.

As shown by reference number 408, the network node 404 may transmit, and the UE 402 may receive, a resource allocation for either downlink or uplink communication. In some aspects, the resource allocation may include a set of PRBs for a communication to be communicated in at least one PRG. As shown by reference number 410, the UE 402 and the network node 404 may communicate based on a precoding rule. The UE 402 and the network node 404 also may communicate based on the resource allocation. In some aspects, communicating a communication may include transmitting and/or receiving the communication. The communication may include a DMRS.

In some aspects, as shown by reference number 412, the resource allocation may indicate a number of PRGs 414 and at least one PRG thereof may include a partial PRG 416 associated with an edge of a subband (an uplink subband ("UL SB"), a downlink subband ("DL SB") and/or guardband between the UL SB and the DL SB) of the SBFD configuration. For example, the number of contiguous allocated PRBs in a PRG may be less than the PRG size P. The precoding rule may include a partial PRG rule associated with the partial PRG 416. For example, in some aspects, communication associated with the partial PRG 416 may be not allowed and in some other aspects, the communication may be allowed subject to satisfaction of a condition. In the case in which the communication is not allowed, the UE may not expect to be configured with communication associated with partial PRG and, as a result, the UE 402 may drop or cancel at least a portion of the communication associated with the partial PRG 416 (e.g., may refrain from receiving a DMRS/PDSCH in the partial PRG 416 or transmitting a DMRS/PUSCH in the partial PRG 416) and/or the network node 404 may drop the partial PRG 416.

In cases in which the communication is allowed, the UE 402 and/or network node 404 may communicate in the partial PRG based on a condition associated with a number of RBs and/or a PRG size. For example, the UE 402 and/or network node 404 may communicate a portion of the communication associated with the partial PRG based on a condition being satisfied. In some aspects, the condition may be satisfied based on a minimum quantity of PRBs associated with the partial PRG satisfying a threshold (e.g., at least two RBs when the PRG size P=4). In some aspects, the condition may be satisfied based on a PRG size (e.g., P=4) and/or the at least one PRG corresponding to a wideband configuration. In some aspects, the UE 402 and/or the network node 404 may assume that the partial PRG 416 is extended with one or more adjacent PRGs 414. For example, in some aspects, communicating the communication based on the partial PRG rule may include communicating a portion of the communication associated with the partial PRG based on a precoding associated with a PRG 414 adjacent to the partial PRG 416.

In some aspects, the resource allocation may indicate a non-contiguous set of PRBs across two downlink subbands (e.g., within a downlink bandwidth part). For example, as shown by reference number 418, the resource allocation may indicate a non-contiguous set of PRBs. For example, as shown, the non-contiguous set of PRBs may include a first subset 420 of contiguous PRBs corresponding to a PDSCH and a second subset 422 of contiguous PRBs corresponding to the PDSCH, which may include DMRSs 424 across the two downlink subbands. A precoding granularity may be configured as a wideband granularity (e.g., $P'_{BWP,i}$ may be determined as "wideband"). In some aspects, a communication associated with non-contiguous PRBs may not be allowed, and in some other aspects, the communication may be allowed subject to one or more conditions.

In aspects in which the communication associated with non-contiguous PRBs are not allowed, the UE may not expect to be scheduled with non-contiguous PRBs across the two subbands on wideband downlink precoding. For example, in some aspects, performing the wireless communication operation based on the precoding rule may include refraining from communicating the communication. In some aspects, the precoding rule may indicate that a first wideband precoding is to be applied to the first subset 420 of contiguous PRBs of the non-contiguous set of PRBs and a second wideband precoding is to be applied to the second subset 422 of contiguous PRBs of the non-contiguous set of PRBs. In some aspects, the same precoding may be applied to the first subset 420 and the second subset 422 (e.g., the first wideband precoding may be the same as the second wideband precoding) based on a network node capability associated with maintaining frequency phase coherency across the two subsets 420 and 422, a quantity of PRBs of each of the first and second subsets 420 and 422 of PRBs satisfying a threshold, and/or a UE capability associated with wideband precoding, among other examples.

In some aspects, as shown by reference number 426, a CORESET 428 may be associated with the two downlink subbands and may overlap the uplink subband. A precoding granularity may be configured so that a corresponding precoder is applied to contiguous PRBs included within the CORESET 428. As shown, the CORESET 428 may include, for example, a first subset 430 of contiguous PRBs associated with a first downlink subband and a second subset 432 of contiguous PRBs associated with a second downlink subband that, together, make up a non-contiguous set of PRBs. In some aspects, the precoding rule may indicate that a precoding applied to all resource element groups (REGs) within the first subset 430 of contiguous PRBs of the non-contiguous set of PRBs is to be applied to all REGs within the second subset 432 of contiguous PRBs of the non-contiguous set of PRBs. In some aspects, the precoding may be applied to all of the REGs within the first subset 430 and the second subset 432 based on a quantity of PRBs of each of the first and second subsets of PRBs satisfying a threshold and/or based on a network node capability associated with frequency phase coherency, among other examples.

As indicated above, FIG. 4 is provided as an example. Other examples may differ from what is described with respect to FIG. 4.

Figure 5:
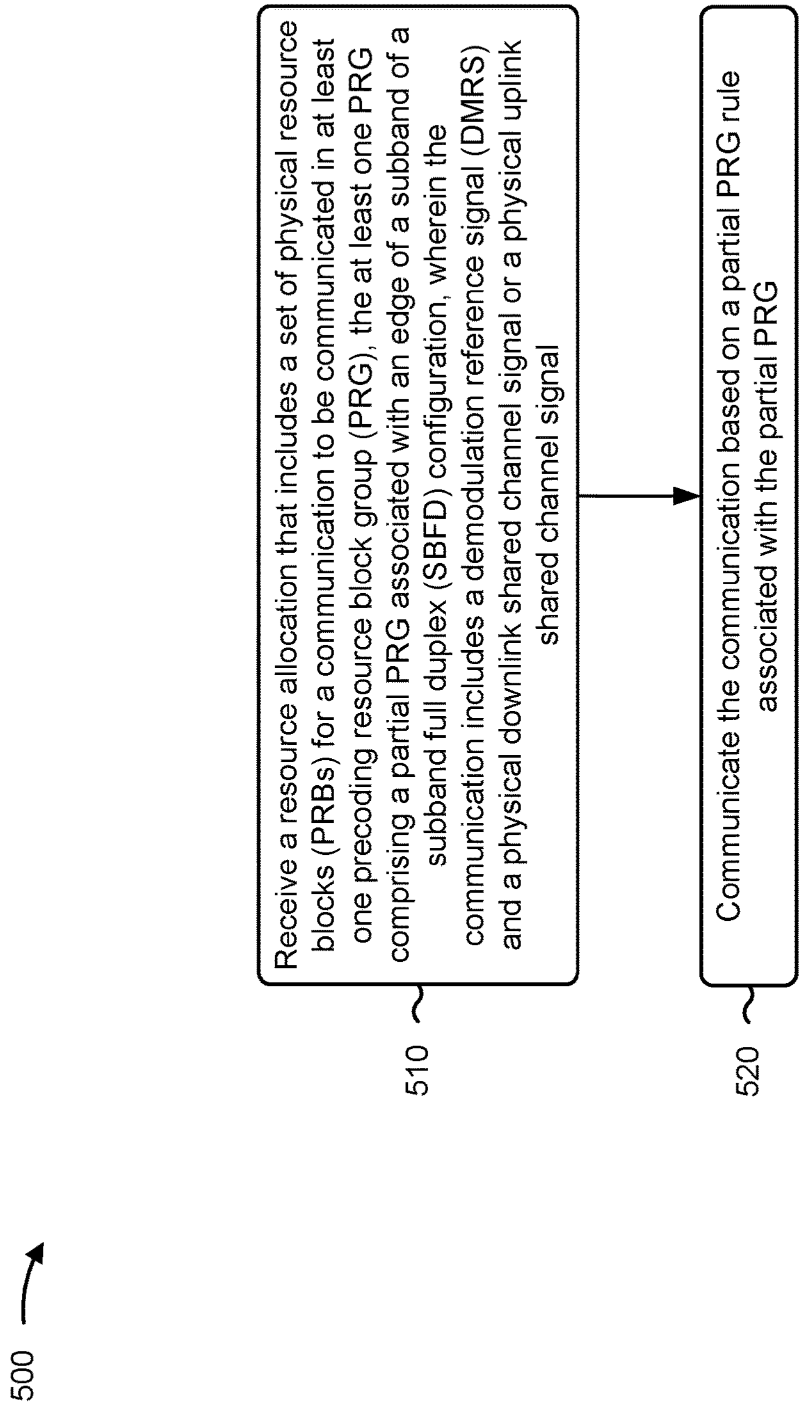
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 402) performs operations associated with DMRS and PDSCH or PUSCH precoding in PRGs associated with SBFD configurations.

As shown in FIG. 5, in some aspects, process 500 may include receiving a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal (block 510). For example, the UE (e.g., using communication manager 908 and/or reception component 902, depicted in FIG. 9) may receive a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal, as described above.

As further shown in FIG. 5, in some aspects, process 500 may include communicating the communication based on a partial PRG rule associated with the partial PRG (block 520). For example, the UE (e.g., using communication manager 908, reception component 902, and/or transmission component 904, depicted in FIG. 9) may communicate the communication based on a partial PRG rule associated with the partial PRG, as described above.

Process 500 may include additional aspects, such as any single aspect or any combination of aspects described below and/or in connection with one or more other processes described elsewhere herein.

In a first aspect, communicating the communication based on the partial PRG rule comprises dropping or cancelling a portion of the communication associated with the partial PRG based on the partial PRG rule. In a second aspect, alone or in combination with the first aspect, communicating the communication based on the partial PRG rule comprises communicating a portion of the communication associated with the partial PRG based on a condition being satisfied. In a third aspect, alone or in combination with the second aspect, the condition is satisfied based on a minimum quantity of PRBs associated with the partial PRG satisfying a threshold. In a fourth aspect, alone or in combination with one or more of the second or third aspects, the condition is satisfied based on a PRG size corresponding to the at least one PRG. In a fifth aspect, alone or in combination with one or more of the second through fourth aspects, the condition is satisfied based on the at least one PRG corresponding to a wideband configuration.

In a sixth aspect, alone or in combination with one or more of the first through fifth aspects, communicating the communication based on the partial PRG rule comprises communicating a portion of the communication associated with the partial PRG based on a precoding associated with a PRG adjacent to the partial PRG.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
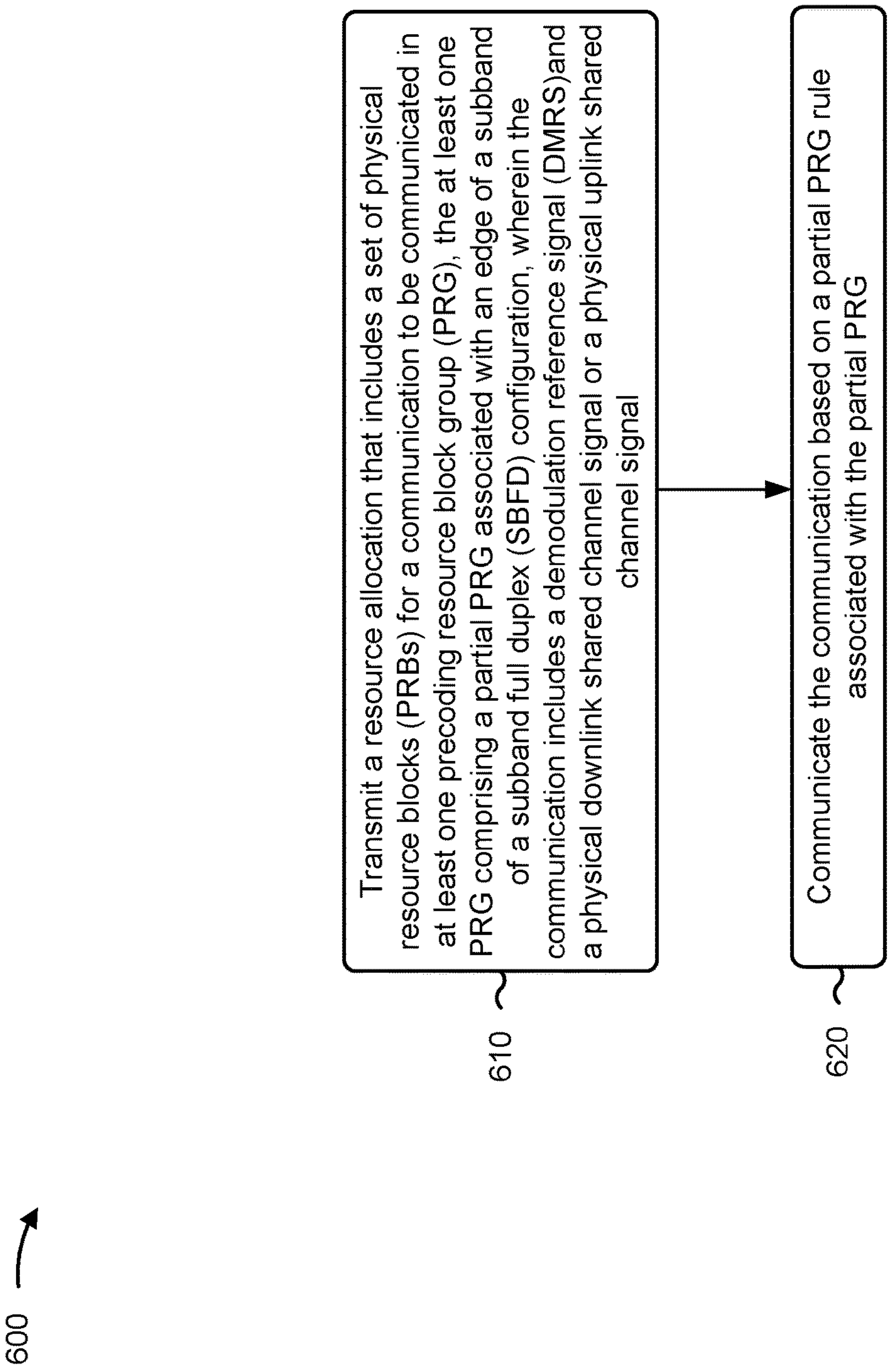
FIG. 6 is a diagram illustrating an example process performed, for example, by a network node, in accordance with the present disclosure.

FIG. 6 is a diagram illustrating an example process 600 performed, for example, by a network node, in accordance with the present disclosure. Example process 600 is an example where the network node (e.g., network node 404) performs operations associated with DMRS/PDSCH and/or DMRS/PUSCH precoding in PRGs associated with SBFD configurations.

As shown in FIG. 6, in some aspects, process 600 may include transmitting a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal (block 610). For example, the network node (e.g., using communication manager 1008 and/or transmission component 1004, depicted in FIG. 10) may transmit a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal, as described above.

As further shown in FIG. 6, in some aspects, process 600 may include communicating the communication based on a partial PRG rule associated with the partial PRG (block 620). For example, the network node (e.g., using communication manager 1008, reception component 1002, and/or transmission component 1004, depicted in FIG. 10) may communicate the communication based on a partial PRG rule associated with the partial PRG, as described above.

Process 600 may include additional aspects, such as any single aspect or any combination of aspects described below and/or in connection with one or more other processes described elsewhere herein.

In a first aspect, a portion of the communication associated with the partial PRG is dropped based on the partial PRG rule. In a second aspect, alone or in combination with the first aspect, communicating the communication based on the partial PRG rule comprises communicating a portion of the communication associated with the partial PRG based on a condition being satisfied. In a third aspect, alone or in combination with the second aspect, the condition is satisfied based on a minimum quantity of PRBs associated with the partial PRG satisfying a threshold. In a fourth aspect, alone or in combination with one or more of the second or third aspects, the condition is satisfied based on a PRG size corresponding to the at least one PRG. In a fifth aspect, alone or in combination with one or more of the second through fourth aspects, the condition is satisfied based on the at least one PRG corresponding to a wideband configuration.

In a sixth aspect, alone or in combination with one or more of the first through fifth aspects, communicating the communication based on the partial PRG rule comprises communicating a portion of the communication associated with the partial PRG based on a precoding associated with a PRG adjacent to the partial PRG.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
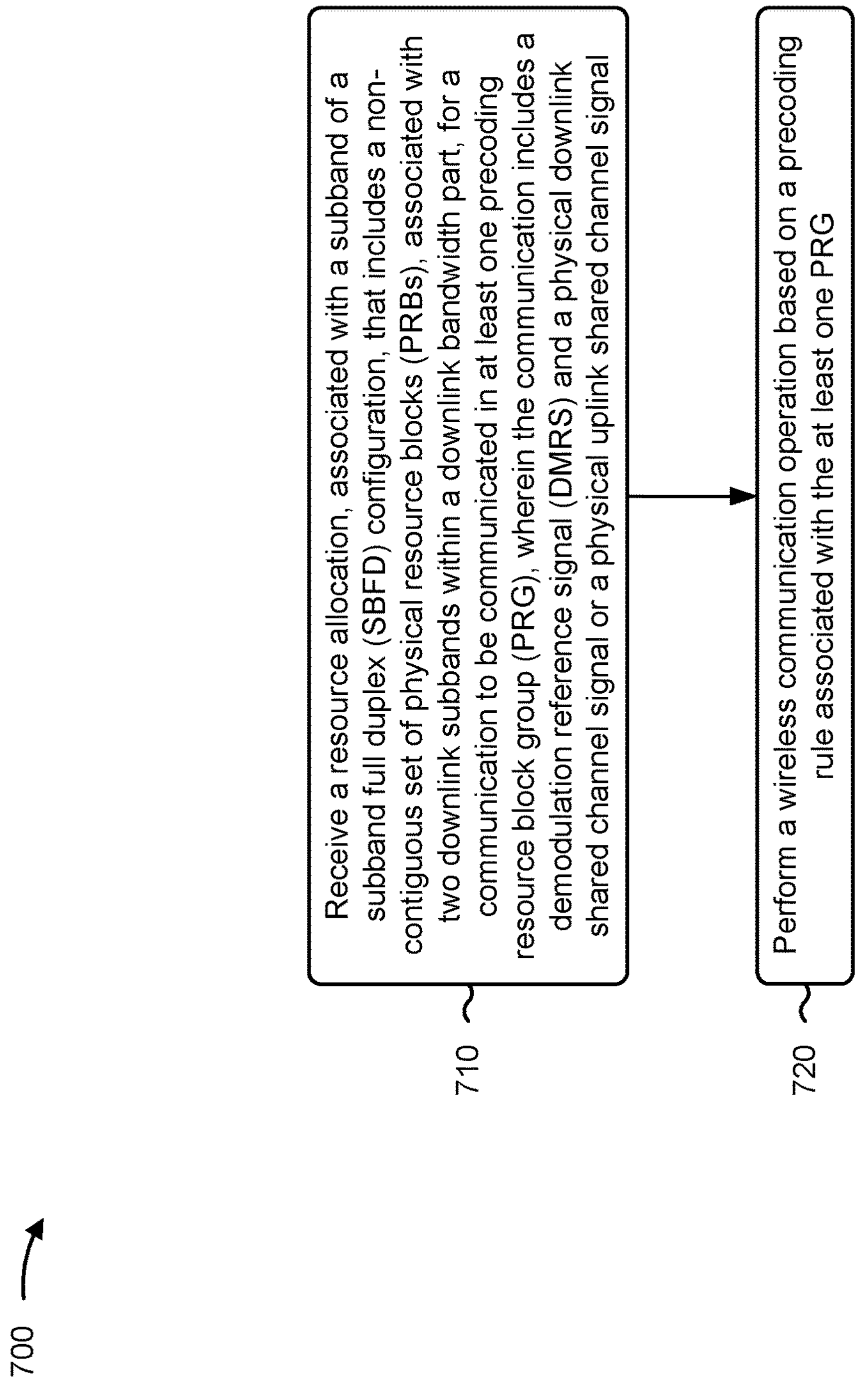
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 402) performs operations associated with DMRS/PDSCH and/or DMRS/PUSCH precoding in PRGs associated with SBFD configurations.

As shown in FIG. 7, in some aspects, process 700 may include receiving a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal (block 710). For example, the UE (e.g., using communication manager 908 and/or reception component 902, depicted in FIG. 9) may receive a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal, as described above.

As further shown in FIG. 7, in some aspects, process 700 may include performing a wireless communication operation based on a precoding rule associated with the at least one PRG (block 720). For example, the UE (e.g., using communication manager 908, reception component 902, and/or transmission component 904, depicted in FIG. 9) may perform a wireless communication operation based on a precoding rule associated with the at least one PRG, as described above.

Process 700 may include additional aspects, such as any single aspect or any combination of aspects described below and/or in connection with one or more other processes described elsewhere herein.

In a first aspect, a precoding granularity is configured as a wideband granularity. In a second aspect, alone or in combination with the first aspect, performing the wireless communication operation based on the precoding rule comprises refraining from communicating the communication. In a third aspect, alone or in combination with one or more of the first and second aspects, the precoding rule indicates that a first wideband precoding is to be applied to a first subset of contiguous PRBs of the non-contiguous set of PRBs and a second wideband precoding is to be applied to a second subset of contiguous PRBs of the non-contiguous set of PRBs, the first subset corresponding to a first downlink subband of the two downlink subbands and the second subset corresponding to a second downlink subband of the two downlink subbands. In a fourth aspect, alone or in combination with the third aspect, the first and second wideband precodings are respectively applied to the first subset and the second subset based on a network node capability associated with frequency phase coherency. In a fifth aspect, alone or in combination with one or more of the third or fourth aspects, the precoding is applied to the first subset and the second subset based on a quantity of PRBs of each of the first and second subsets of PRBs satisfying a threshold. In a sixth aspect, alone or in combination with one or more of the third through fifth aspects, the precoding is applied to the first subset and the second subset based on a UE capability associated with precoding. In an additional aspect, alone or in combination with one or more of the third through sixth aspects, the first wideband precoding is the same as the second wideband precoding. In an additional aspect, alone or in combination with one or more of the third through sixth aspects, the first wideband precoding is different from the second wideband precoding.

In a seventh aspect, alone or in combination with one or more of the first through sixth aspects, a precoding granularity is configured so that a corresponding precoder is applied to contiguous PRBs, and a CORESET associated with the two downlink subbands includes the non-contiguous set of PRBs and overlaps an uplink subband. In an eighth aspect, alone or in combination with the seventh aspect, the precoding rule indicates that a precoding applied to all REGs within a first subset of contiguous PRBs of the non-contiguous set of PRBs is to be applied to all REGs within a second subset of contiguous PRBs of the non-contiguous set of PRBs, the first subset corresponding to a first downlink subband of the two downlink subbands and the second subset corresponding to a second downlink subband of the two downlink subbands. In a ninth aspect, alone or in combination with the eighth aspect, the precoding is applied to the first subset and the second subset based on a quantity of PRBs of each of the first and second subsets of PRBs satisfying a threshold. In a tenth aspect, alone or in combination with one or more of the eighth or ninth aspects, the precoding is applied to the first subset and the second subset based on a network node capability associated with frequency phase coherency.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
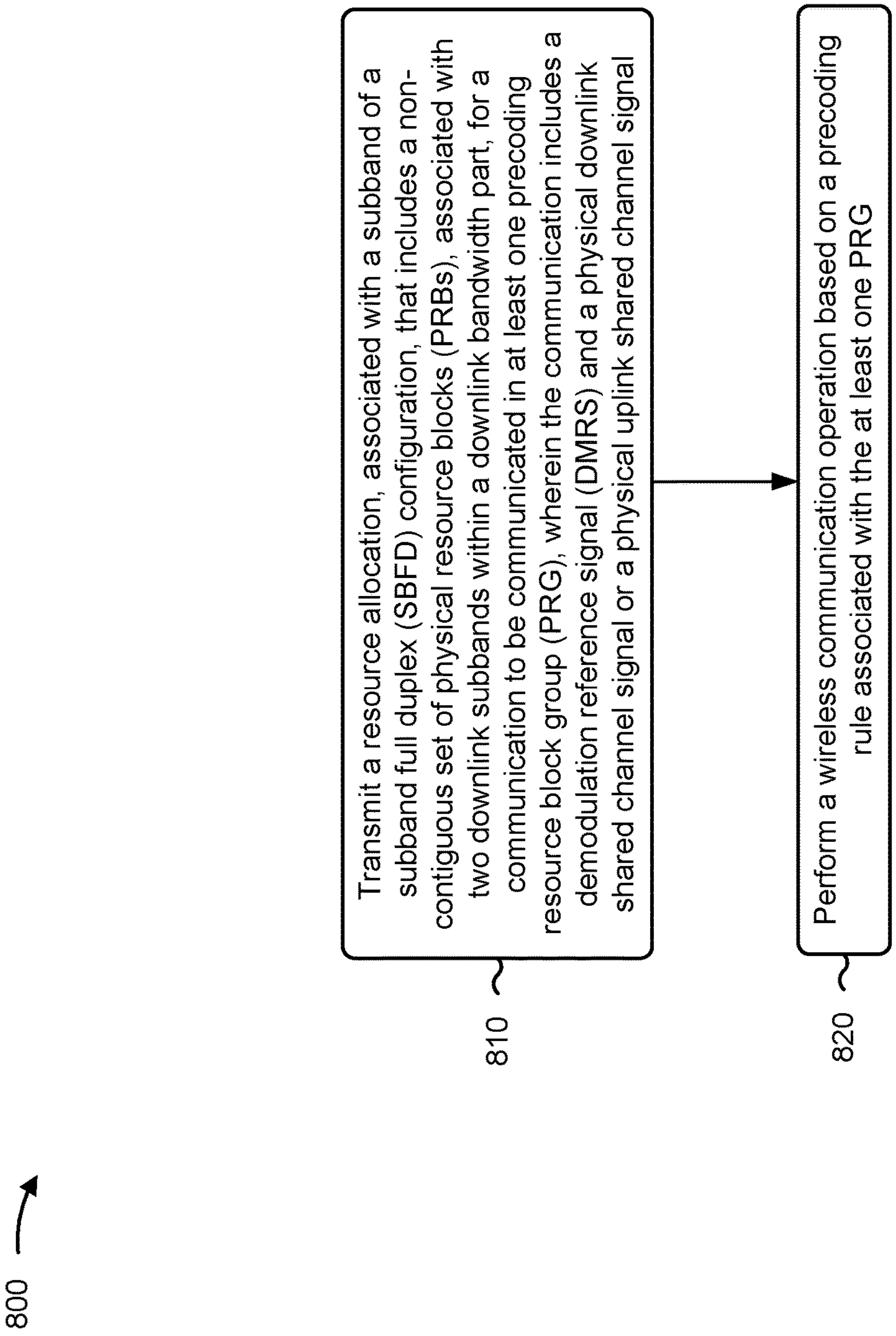
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 404) performs operations associated with DMRS/PDSCH and/or DMRS/PUSCH precoding in PRGs associated with SBFD configurations.

As shown in FIG. 8, in some aspects, process 800 may include transmitting a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal (block 810). For example, the network node (e.g., using communication manager 1008 and/or transmission component 1004, depicted in FIG. 10) may transmit a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal, as described above.

As further shown in FIG. 8, in some aspects, process 800 may include performing a wireless communication operation based on a precoding rule associated with the at least one PRG (block 820). For example, the network node (e.g., using communication manager 1008, reception component 1002, and/or transmission component 1004, depicted in FIG. 10) may perform a wireless communication operation based on a precoding rule associated with the at least one PRG, as described above.

Process 800 may include additional aspects, such as any single aspect or any combination of aspects described below and/or in connection with one or more other processes described elsewhere herein.

In a first aspect, a precoding granularity is configured as a wideband granularity. In a second aspect, alone or in combination with the first aspect, performing the wireless communication operation based on the precoding rule comprises refraining from communicating the communication. In a third aspect, alone or in combination with one or more of the first and second aspects, the precoding rule indicates that a first wideband precoding is to be applied to a first subset of contiguous PRBs of the non-contiguous set of PRBs and a second wideband precoding is to be applied to a second subset of contiguous PRBs of the non-contiguous set of PRBs, the first subset corresponding to a first downlink subband of the two downlink subbands and the second subset corresponding to a second downlink subband of the two downlink subbands. In a fourth aspect, alone or in combination with the third aspect, the precoding is applied to the first subset and the second subset based on a network node capability associated with frequency phase coherency. In a fifth aspect, alone or in combination with one or more of the third or fourth aspects, the precoding is applied to the first subset and the second subset based on a quantity of PRBs of each of the first and second subsets of PRBs satisfying a threshold. In a sixth aspect, alone or in combination with one or more of the third through fifth aspects, the precoding is applied to the first subset and the second subset based on a UE capability associated with precoding. In an additional aspect, alone or in combination with one or more of the third through sixth aspects, the first wideband precoding is the same as the second wideband precoding. In an additional aspect, alone or in combination with one or more of the third through sixth aspects, the first wideband precoding is different from the second wideband precoding.

In a seventh aspect, alone or in combination with one or more of the first through sixth aspects, a precoding granularity is configured so that a corresponding precoder is applied to contiguous PRBs, and a CORESET associated with the two downlink subbands includes the non-contiguous set of PRBs and overlaps an uplink subband. In an eighth aspect, alone or in combination with the seventh aspect, the precoding rule indicates that a precoding applied to all REGs within a first subset of contiguous PRBs of the non-contiguous set of PRBs is to be applied to all REGs within a second subset of contiguous PRBs of the non-contiguous set of PRBs, the first subset corresponding to a first downlink subband of the two downlink subbands and the second subset corresponding to a second downlink subband of the two downlink subbands. In a ninth aspect, alone or in combination with the eighth aspect, the precoding is applied to the first subset and the second subset based on a quantity of PRBs of each of the first and second subsets of PRBs satisfying a threshold.

In a tenth aspect, alone or in combination with one or more of the first through ninth aspects, the precoding is applied to the first subset and the second subset based on a network node capability associated with maintaining frequency phase coherency across the first subset and the second subset.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
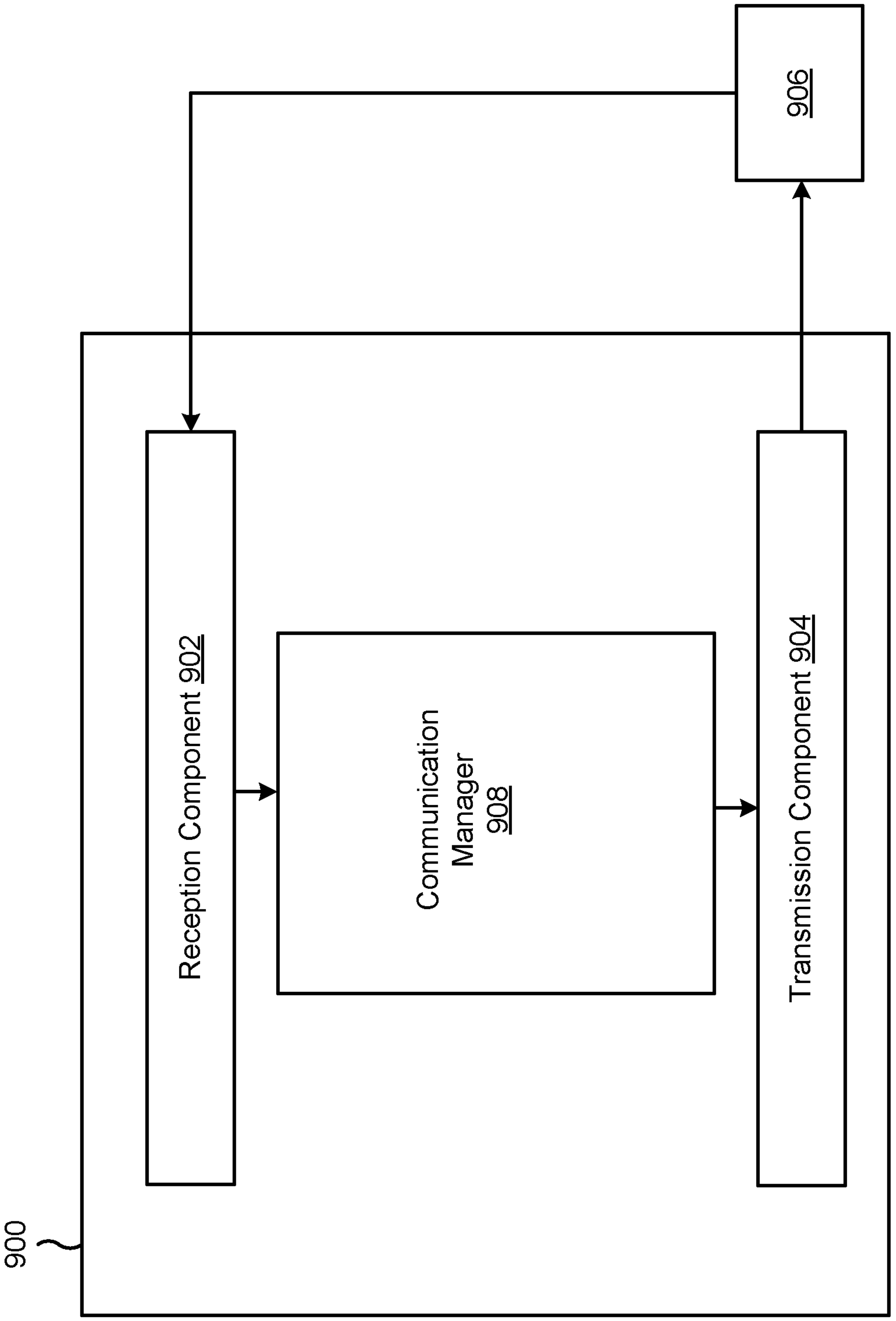
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908.

In some aspects, the apparatus 900 may be configured to perform one or more operations described herein in connection with FIG. 4. Additionally, or alternatively, the apparatus 900 may be configured to perform one or more processes described herein, such as process 500 of FIG. 5, process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

In some examples, means for transmitting, outputting, or sending (or means for outputting for transmission) may include one or more antennas, a modulator, a transmit MIMO processor, a transmit processor, or a combination thereof, of the UE described above in connection with FIG. 2.

In some examples, means for receiving (or means for obtaining) may include one or more antennas, a demodulator, a MIMO detector, a receive processor, or a combination thereof, of the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for receiving, transmitting, communicating, and/or performing may include various processing system components, such as a receive processor, a transmit processor, a controller/processor, a memory, or a combination thereof, of the UE described above in connection with FIG. 2.

The communication manager 908 and/or the reception component 902 may receive a resource allocation that includes a set of PRBs for a communication to be communicated in at least one PRG, the at least one PRG comprising a partial PRG associated with an edge of an SBFD configuration, wherein the communication includes a DMRS and a physical downlink data channel signal or a physical uplink data channel signal.

In some aspects, the communication manager 908 may include one or more antennas, a modem, a controller/processor, a memory, or a combination thereof, of the UE described in connection with FIG. 2. In some aspects, the communication manager 908 may include the reception component 902 and/or the transmission component 904. In some aspects, the communication manager 908 may be, be similar to, include, or be included in, the communication manager 140 depicted in FIGS. 1 and 2. The communication manager 908, the reception component 902, and/or the transmission component 904 may communicate the communication based on a partial PRG rule associated with the partial PRG.

The communication manager 908 and/or the reception component 902 may receive a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal. The communication manager 908, the reception component 902, and/or the transmission component 904 may perform a wireless communication operation based on a precoding rule associated with the at least one PRG.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
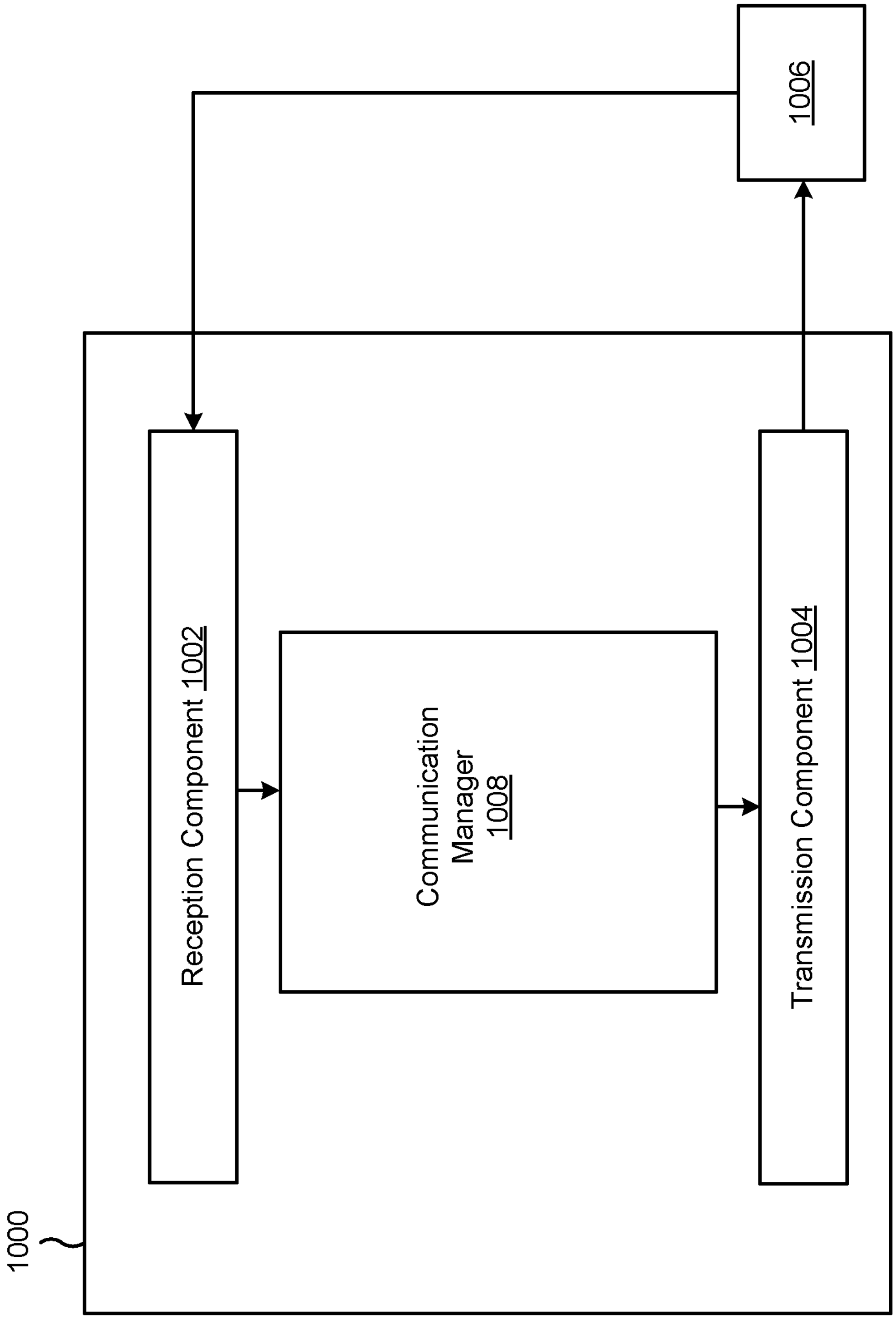
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008.

In some aspects, the apparatus 1000 may be configured to perform one or more operations described herein in connection with FIG. 4. Additionally, or alternatively, the apparatus 1000 may be configured to perform one or more processes described herein, such as process 600 of FIG. 6, process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1008 and/or the transmission component 1004 may transmit a resource allocation that includes a set of PRBs for a communication to be communicated in at least one PRG, the at least one PRG comprising a partial PRG associated with an edge of a subband of an SBFD configuration, wherein the communication includes a DMRS and a physical downlink data channel signal or a physical uplink data channel signal.

In some aspects, the communication manager 1008 may include one or more antennas, a modem, a controller/processor, a memory, or a combination thereof, of the network node described in connection with FIG. 2. In some aspects, the communication manager 1008 may include the reception component 1002 and/or the transmission component 1004. In some aspects, the communication manager 1008 may be, be similar to, include, or be included in, the communication manager 150 depicted in FIGS. 1 and 2. The communication manager 1008, the reception component 1002, and/or the transmission component 1004 may communicate the communication based on a partial PRG rule associated with the partial PRG.

The communication manager 1008 and/or the transmission component 1004 may transmit a resource allocation, associated with an SBFD configuration, that includes a non-contiguous set of PRBs, associated with two downlink subbands within a downlink bandwidth part, for a communication to be communicated in at least one PRG, wherein the communication includes a DMRS and a physical downlink data channel signal or a physical uplink data channel signal. The communication manager 1008, the reception component 1002, and/or the transmission component 1004 may perform a wireless communication operation based on a precoding rule associated with the at least one PRG.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a resource allocation that includes a set of physical resource blocks (PRBs) for a communication to be communicated in at least one precoding resource block group (PRG), the at least one PRG comprising a partial PRG associated with an edge of a subband of a subband full duplex (SBFD) configuration, wherein the communication includes a demodulation reference signal (DMRS) and a physical downlink data channel signal or a physical uplink data channel signal; and communicating the communication based on a partial PRG rule associated with the partial PRG.

Aspect 2: The method of Aspect 1, wherein communicating the communication based on the partial PRG rule comprises dropping or cancelling a portion of the communication associated with the partial PRG based on the partial PRG rule.

Aspect 3: The method of any of Aspects 1-2, wherein communicating the communication based on the partial PRG rule comprises communicating a portion of the communication associated with the partial PRG based on a condition being satisfied.

Aspect 4: The method of Aspect 3, wherein the condition is satisfied based on a minimum quantity of PRBs associated with the partial PRG satisfying a threshold.

Aspect 5: The method of either of Aspects 3 or 4, wherein the condition is satisfied based on a PRG size corresponding to the at least one PRG.

Aspect 6: The method of any of Aspects 3-5, wherein the condition is satisfied based on the at least one PRG corresponding to a wideband configuration.

Aspect 7: The method of any of Aspects 1-6, wherein communicating the communication based on the partial PRG rule comprises communicating a portion of the communication associated with the partial PRG based on a precoding associated with a PRG adjacent to the partial PRG.

Aspect 8: A method of wireless communication performed by a network node, comprising: transmitting a resource allocation that includes a set of physical resource blocks (PRBs) for a communication to be communicated in at least one precoding resource block group (PRG), the at least one PRG comprising a partial PRG associated with an edge of a subband of a subband full duplex (SBFD) configuration, wherein the communication includes a demodulation reference signal (DMRS) and a physical downlink data channel signal or a physical uplink data channel signal; and communicating the communication based on a partial PRG rule associated with the partial PRG.

Aspect 9: The method of Aspect 8, wherein a portion of the communication associated with the partial PRG is dropped based on the partial PRG rule.

Aspect 10: The method of any of Aspects 8-9, wherein communicating the communication based on the partial PRG rule comprises communicating a portion of the communication associated with the partial PRG based on a condition being satisfied.

Aspect 11: The method of Aspect 10, wherein the condition is satisfied based on a minimum quantity of PRBs associated with the partial PRG satisfying a threshold.

Aspect 12: The method of either of Aspects 10 or 11, wherein the condition is satisfied based on a PRG size corresponding to the at least one PRG.

Aspect 13: The method of any of Aspects 10-12, wherein the condition is satisfied based on the at least one PRG corresponding to a wideband configuration.

Aspect 14: The method of any of Aspects 8-13, wherein communicating the communication based on the partial PRG rule comprises communicating a portion of the communication associated with the partial PRG based on a precoding associated with a PRG adjacent to the partial PRG.

Aspect 15: A method of wireless communication performed by a user equipment (UE), comprising: receiving a resource allocation, associated with a subband of a subband full duplex (SBFD) configuration, that includes a non-contiguous set of physical resource blocks (PRBs), associated with two downlink subbands within a downlink bandwidth part, for a communication to be communicated in at least one precoding resource block group (PRG), wherein the communication includes a demodulation reference signal (DMRS) and a physical downlink data channel signal or a physical uplink data channel signal; and performing a wireless communication operation based on a precoding rule associated with the at least one PRG.

Aspect 16: The method of Aspect 15, wherein a precoding granularity is configured as a wideband granularity.

Aspect 17: The method of either of claim 15 or 16, wherein performing the wireless communication operation based on the precoding rule comprises refraining from communicating the communication.

Aspect 18: The method of either of claim 15 or 16, wherein the precoding rule indicates that a first wideband precoding is to be applied to a first subset of contiguous PRBs of the non-contiguous set of PRBs and a second wideband precoding is to be applied to a second subset of contiguous PRBs of the non-contiguous set of PRBs, the first subset corresponding to a first downlink subband of the two downlink subbands and the second subset corresponding to a second downlink subband of the two downlink subbands.

Aspect 19: The method of Aspect 18, wherein the first and second wideband precodings are respectively associated with the first subset and the second subset based on a network node capability associated with maintaining frequency phase coherency across the first subset and the second subset.

Aspect 20: The method of either of Aspects 18 or 19, wherein the first and second wideband precodings are respectively associated with the first subset and the second subset based on a quantity of PRBs of each of the first and second subsets of PRBs satisfying a threshold.

Aspect 21: The method of any of Aspects 18-20, wherein the first and second wideband precodings are respectively associated with the first subset and the second subset based on a UE capability associated with wideband precoding.

Aspect 22: The method of any of Aspects 15-21, wherein a precoding granularity is configured so that a corresponding precoder is applied to contiguous PRBs, and wherein a control resource set (CORESET) associated with the two downlink subbands includes the non-contiguous set of PRBs and overlaps an uplink subband.

Aspect 23: The method of Aspect 22, wherein the precoding rule indicates that a precoding applied to all resource element groups (REGs) within a first subset of contiguous PRBs of the non-contiguous set of PRBs is to be applied to all REGs within a second subset of contiguous PRBs of the non-contiguous set of PRBs, the first subset corresponding to a first downlink subband of the two downlink subbands and the second subset corresponding to a second downlink subband of the two downlink subbands.

Aspect 24: The method of Aspect 23, wherein the precoding is associated with the first subset and the second subset based on a quantity of PRBs of each of the first and second subsets of PRBs satisfying a threshold.

Aspect 25: The method of either of Aspects 23 or 24, wherein the precoding is associated with the first subset and the second subset based on a network node capability associated with frequency phase coherency.

Aspect 26: A method of wireless communication performed by a network node, comprising: transmitting a resource allocation, associated with a subband of a subband full duplex (SBFD) configuration, that includes a non-contiguous set of physical resource blocks (PRBs), associated with two downlink subbands within a downlink bandwidth part, for a communication to be communicated in at least one precoding resource block group (PRG), wherein the communication includes a demodulation reference signal (DMRS) and a physical downlink data channel signal or a physical uplink data channel signal; and performing a wireless communication operation based on a precoding rule associated with the at least one PRG.

Aspect 27: The method of Aspect 26, wherein a precoding granularity is configured as a wideband granularity.

Aspect 28: The method of Aspect 27, wherein performing the wireless communication operation based on the precoding rule comprises refraining from communicating the communication.

Aspect 29: The method of Aspect 27, wherein the precoding rule indicates that a first wideband precoding is to be applied to a first subset of contiguous PRBs of the non-contiguous set of PRBs and a second wideband precoding is to be applied to a second subset of contiguous PRBs of the non-contiguous set of PRBs, the first subset corresponding to a first downlink subband of the two downlink subbands and the second subset corresponding to a second downlink subband of the two downlink subbands.

Aspect 30: The method of Aspect 29, wherein the first and second wideband precodings are respectively applied to the first subset and the second subset based on a network node capability associated with maintaining frequency phase coherency across the first subset and the second subset.

Aspect 31: The method of either of Aspects 29 or 30, wherein the first and second wideband precodings are respectively applied to the first subset and the second subset based on a quantity of PRBs of each of the first and second subsets of PRBs satisfying a threshold.

Aspect 32: The method of any of Aspects 29-31, wherein the first and second wideband precodings are respectively applied to the first subset and the second subset based on a UE capability associated with wideband precoding.

Aspect 33: The method of any of Aspects 26-32, wherein a precoding granularity is configured so that a corresponding precoder is applied to contiguous PRBs, and wherein a control resource set (CORESET) associated with the two downlink subbands includes the non-contiguous set of PRBs and overlaps an uplink subband.

Aspect 34: The method of Aspect 33, wherein the precoding rule indicates that a precoding applied to all resource element groups (REGs) within a first subset of contiguous PRBs of the non-contiguous set of PRBs is to be applied to all REGs within a second subset of contiguous PRBs of the non-contiguous set of PRBs, the first subset corresponding to a first downlink subband of the two downlink subbands and the second subset corresponding to a second downlink subband of the two downlink subbands.

Aspect 35: The method of Aspect 34, wherein the precoding is associated with the first subset and the second subset based on a quantity of PRBs of each of the first and second subsets of PRBs satisfying a threshold.

Aspect 36: The method of either of Aspects 34 or 35, wherein the precoding is associated with the first subset and the second subset based on a network node capability associated with maintaining frequency phase coherency across the first subset and the second subset.

Aspect 37: The method of any of Aspects 18-21 or 29-32, wherein the first wideband precoding is the same as the second wideband precoding.

Aspect 38: The method of any of Aspects 18-21 or 29-32, wherein the first wideband precoding is different from the second wideband precoding.

Aspect 39: An apparatus for wireless communication at a device, comprising a processor; memory coupled with the processor; and instructions stored in the memory and executable by the processor to cause the apparatus to perform the method of one or more of Aspects 1-7.

Aspect 40: A device for wireless communication, comprising a memory and one or more processors coupled to the memory, the one or more processors configured to perform the method of one or more of Aspects 1-7.

Aspect 41: An apparatus for wireless communication, comprising at least one means for performing the method of one or more of Aspects 1-7.

Aspect 42: A non-transitory computer-readable medium storing code for wireless communication, the code comprising instructions executable by a processor to perform the method of one or more of Aspects 1-7.

Aspect 43: A non-transitory computer-readable medium storing a set of instructions for wireless communication, the set of instructions comprising one or more instructions that, when executed by one or more processors of a device, cause the device to perform the method of one or more of Aspects 1-7.

Aspect 44: An apparatus for wireless communication at a device, comprising a processor; memory coupled with the processor; and instructions stored in the memory and executable by the processor to cause the apparatus to perform the method of one or more of Aspects 8-14.

Aspect 45: A device for wireless communication, comprising a memory and one or more processors coupled to the memory, the one or more processors configured to perform the method of one or more of Aspects 8-14.

Aspect 46: An apparatus for wireless communication, comprising at least one means for performing the method of one or more of Aspects 8-14.

Aspect 47: A non-transitory computer-readable medium storing code for wireless communication, the code comprising instructions executable by a processor to perform the method of one or more of Aspects 8-14.

Aspect 48: A non-transitory computer-readable medium storing a set of instructions for wireless communication, the set of instructions comprising one or more instructions that, when executed by one or more processors of a device, cause the device to perform the method of one or more of Aspects 8-14.

Aspect 49: An apparatus for wireless communication at a device, comprising a processor; memory coupled with the processor; and instructions stored in the memory and executable by the processor to cause the apparatus to perform the method of one or more of Aspects 15-25 or 37.

Aspect 50: A device for wireless communication, comprising a memory and one or more processors coupled to the memory, the one or more processors configured to perform the method of one or more of Aspects 15-25 or 37.

Aspect 51: An apparatus for wireless communication, comprising at least one means for performing the method of one or more of Aspects 15-25 or 37.

Aspect 52: A non-transitory computer-readable medium storing code for wireless communication, the code comprising instructions executable by a processor to perform the method of one or more of Aspects 15-25 or 37.

Aspect 53: A non-transitory computer-readable medium storing a set of instructions for wireless communication, the set of instructions comprising one or more instructions that, when executed by one or more processors of a device, cause the device to perform the method of one or more of Aspects 15-25 or 37.

Aspect 54: An apparatus for wireless communication at a device, comprising a processor; memory coupled with the processor; and instructions stored in the memory and executable by the processor to cause the apparatus to perform the method of one or more of Aspects 26-36 or 38.

Aspect 55: A device for wireless communication, comprising a memory and one or more processors coupled to the memory, the one or more processors configured to perform the method of one or more of Aspects 26-36 or 38.

Aspect 56: An apparatus for wireless communication, comprising at least one means for performing the method of one or more of Aspects 26-36 or 38.

Aspect 57: A non-transitory computer-readable medium storing code for wireless communication, the code comprising instructions executable by a processor to perform the method of one or more of Aspects 26-36 or 38.

Aspect 58: A non-transitory computer-readable medium storing a set of instructions for wireless communication, the set of instructions comprising one or more instructions that, when executed by one or more processors of a device, cause the device to perform the method of one or more of Aspects 26-36 or 38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

memory; and one or more processors coupled with the memory and configured to cause the UE to:

receive a resource allocation that includes a set of physical resource blocks (PRBs) for a communication to be communicated in at least one precoding resource block group (PRG), the at least one PRG comprising a partial PRG associated with an edge of a subband of a subband full duplex (SBFD) configuration, wherein the communication includes a demodulation reference signal (DMRS) and a physical downlink data channel signal or a physical uplink data channel signal; and communicate a portion of the communication in the partial PRG based on a partial PRG rule associated with the partial PRG and based on a precoding associated with a PRG adjacent to the partial PRG.

2. The UE of claim 1, wherein the one or more processors, to cause the UE to communicate the portion of the communication based on the partial PRG rule, are configured to cause the UE to allow the UE to communicate the portion of the communication in the partial PRG based on a condition being satisfied.

3. The UE of claim 2, wherein the condition is satisfied based on at least one of a minimum quantity of PRBs in the partial PRG satisfying a threshold, a PRG size corresponding to the at least one PRG, or the at least one PRG corresponding to a wideband configuration.

4. A network node for wireless communication, comprising:

memory; and one or more processors coupled with the memory and configured to cause the network node to:

transmit a resource allocation that includes a set of physical resource blocks (PRBs) for a communication to be communicated in at least one precoding resource block group (PRG), the at least one PRG comprising a partial PRG associated with an edge of a subband of a subband full duplex (SBFD) configuration, wherein the communication includes a demodulation reference signal (DMRS) and a physical downlink data channel signal or a physical uplink data channel signal; and communicate a portion of the communication in the partial PRG based on a partial PRG rule associated with the partial PRG and based on a precoding associated with a PRG adjacent to the partial PRG.

5. The network node of claim 4, wherein the one or more processors, to cause the network node to communicate the portion of the communication based on the partial PRG rule, are configured to cause the network node to communicate the portion of the communication in the partial PRG based on a condition being satisfied.

6. The network node of claim 5, wherein the condition is satisfied based on at least one of a minimum quantity of PRBs in the partial PRG satisfying a threshold, a PRG size corresponding to the at least one PRG, or the at least one PRG corresponding to a wideband configuration.

7. A user equipment (UE) for wireless communication, comprising:

memory; and one or more processors coupled with the memory and configured to cause the UE to:

receive a resource allocation, associated with a subband full duplex (SBFD) configuration, that includes a non-contiguous set of physical resource blocks (PRBs), associated with two downlink subbands within a downlink bandwidth part, for a communication to be communicated in at least one precoding resource block group (PRG), wherein:

the communication includes a demodulation reference signal (DMRS) and a physical downlink data channel signal or a physical uplink data channel signal, a precoding granularity is configured so that a corresponding precoder is applied to contiguous PRBs, and a control resource set (CORESET) associated with the two downlink subbands includes the non-contiguous set of PRBs and overlaps an uplink subband; and perform a wireless communication operation based on a precoding rule associated with the at least one PRG, wherein the precoding rule indicates that communication in the at least one PRG is allowed or not allowed.

8. The UE of claim 7, wherein the precoding granularity is configured as a wideband granularity.

9. The UE of claim 7, wherein the one or more processors, to cause the UE to perform the wireless communication operation based on the precoding rule, are configured to cause the UE to refrain from communicating the communication.

10. The UE of claim 7, wherein the precoding rule indicates that a first wideband precoding is to be applied to a first subset of contiguous PRBs of the non-contiguous set of PRBs and a second wideband precoding is to be applied to a second subset of contiguous PRBs of the non-contiguous set of PRBs, the first subset corresponding to a first downlink subband of the two downlink subbands and the second subset corresponding to a second downlink subband of the two downlink subbands.

11. The UE of claim 10, wherein the first and second wideband precodings are respectively applied to the first subset and the second subset based on a network node capability associated with maintaining frequency phase coherency across the first subset and the second subset.

12. The UE of claim 10, wherein the first and second wideband precodings are respectively applied to the first subset and the second subset based on a quantity of PRBs of each of the first and second subsets of PRBs satisfying a threshold.

13. The UE of claim 10, wherein the first and second wideband precodings are respectively applied to the first subset and the second subset based on a UE capability associated with wideband precoding.

14. The UE of claim 10, wherein the first wideband precoding is the same as the second wideband precoding.

15. The UE of claim 10, wherein the first wideband precoding is different from the second wideband precoding.

16. The UE of claim 7, wherein the precoding rule indicates that a precoding applied to all resource element groups (REGs) within a first subset of contiguous PRBs of the non-contiguous set of PRBs is to be applied to all REGs within a second subset of contiguous PRBs of the non-contiguous set of PRBs, the first subset corresponding to a first downlink subband of the two downlink subbands and the second subset corresponding to a second downlink subband of the two downlink subbands.

17. The UE of claim 16, wherein the precoding is applied to the first subset and the second subset based on a quantity of PRBs of each of the first and second subsets of PRBs satisfying a threshold.

18. The UE of claim 16, wherein the precoding is applied to the first subset and the second subset based on a network node capability associated with frequency phase coherency.

19. A network node for wireless communication, comprising:

memory; and one or more processors coupled with the memory and configured to cause the network node to:

transmit a resource allocation, associated with a subband full duplex (SBFD) configuration, that includes a non-contiguous set of physical resource blocks (PRBs), associated with two downlink subbands within a downlink bandwidth part, for a communication to be communicated in at least one precoding resource block group (PRG), wherein:

the communication includes a demodulation reference signal (DMRS) and a physical downlink data channel signal or a physical uplink data channel signal, a precoding granularity is configured so that a corresponding precoder is applied to contiguous PRBs, and a control resource set (CORESET) associated with the two downlink subbands includes the non-contiguous set of PRBs and overlaps an uplink subband; and perform a wireless communication operation based on a precoding rule associated with the at least one PRG, wherein the precoding rule indicates that communication in the at least one PRG is allowed or not allowed.

20. The network node of claim 19, wherein the precoding granularity is configured as a wideband granularity.

21. The network node of claim 20, wherein the one or more processors, to cause the network node to perform the wireless communication operation based on the precoding rule, are configured to cause the network node to refrain from communicating the communication.

22. The network node of claim 20, wherein the precoding rule indicates that a first wideband precoding is to be applied to a first subset of contiguous PRBs of the non-contiguous set of PRBs and a second wideband precoding is to be applied to a second subset of contiguous PRBs of the non-contiguous set of PRBs, the first subset corresponding to a first downlink subband of the two downlink subbands and the second subset corresponding to a second downlink subband of the two downlink subbands.

23. The network node of claim 22, wherein the first and second wideband precodings are respectively applied to the first subset and the second subset based on a network node capability associated with maintaining frequency phase coherency across the first subset and the second subset.

24. The network node of claim 22, wherein the first and second wideband precodings are respectively applied to the first subset and the second subset based on a quantity of PRBs of each of the first and second subsets of PRBs satisfying a threshold.

25. The network node of claim 22, wherein the first and second wideband precodings are respectively applied to the first subset and the second subset based on a UE capability associated with wideband precoding.

26. The network node of claim 22, wherein the first wideband precoding is the same as the second wideband precoding.

27. The network node of claim 22, wherein the first wideband precoding is different from the second wideband precoding.

28. The network node of claim 19, wherein the precoding rule indicates that a precoding applied to all resource element groups (REGs) within a first subset of contiguous PRBs of the non-contiguous set of PRBs is to be applied to all REGs within a second subset of contiguous PRBs of the non-contiguous set of PRBs, the first subset corresponding to a first downlink subband of the two downlink subbands and the second subset corresponding to a second downlink subband of the two downlink subbands.

29. The network node of claim 28, wherein the precoding is applied to the first subset and the second subset based on a quantity of PRBs of each of the first and second subsets of PRBs satisfying a threshold.

30. The network node of claim 28, wherein the precoding is applied to the first subset and the second subset based on a network node capability associated with frequency phase coherency.

* * * * *